United States Patent
Sethi et al.

(10) Patent No.: US 12,117,881 B2
(45) Date of Patent: Oct. 15, 2024

(54) AUTOMATED POWER-RELATED DEVICE USAGE DETERMINATIONS USING ARTIFICIAL INTELLIGENCE TECHNIQUES

(71) Applicant: Dell Products L.P., Round Rock, TX (US)

(72) Inventors: Parminder Singh Sethi, Punjab (IN); Lakshmi Nalam, Bangalore (IN); Vasanth Sathyanarayanan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/106,578

(22) Filed: Feb. 7, 2023

(65) Prior Publication Data

US 2024/0264652 A1    Aug. 8, 2024

(51) Int. Cl.
*G06F 1/32* (2019.01)
*G06F 1/3206* (2019.01)
*G06F 1/3246* (2019.01)

(52) U.S. Cl.
CPC .......... *G06F 1/3206* (2013.01); *G06F 1/3246* (2013.01)

(58) Field of Classification Search
CPC .............................. G06F 1/3206; G06F 1/3246
See application file for complete search history.

(56) References Cited

U.S. PATENT DOCUMENTS

| | | | |
|---|---|---|---|
| 9,778,730 B2 | 10/2017 | Chall et al. | |
| 10,622,682 B2 | 4/2020 | Brockman et al. | |
| 2003/0105983 A1* | 6/2003 | Brakmo | G06F 1/3262 713/320 |
| 2015/0121057 A1* | 4/2015 | Arora | G06F 1/3287 713/100 |
| 2022/0317757 A1* | 10/2022 | Rao | G06F 1/3287 |

OTHER PUBLICATIONS

Prophet: Forecasting at Scale, https://facebook.github.io/prophet/, Feb. 2, 2023.

* cited by examiner

*Primary Examiner* — Stefan Stoynov

(74) *Attorney, Agent, or Firm* — Ryan, Mason & Lewis, LLP

(57) ABSTRACT

Methods, apparatus, and processor-readable storage media for automated power-related device usage determinations using artificial intelligence techniques are provided herein. An example computer-implemented method includes determining power-related information for one or more devices by processing utilization data associated with the device(s) using artificial intelligence techniques; determining, based at least in part on the power-related information, multiple instances of inactivity and durations thereof for the device(s); determining at least one particular duration of inactivity for the device(s) based at least in part on a number of occurrences of each of the determined durations of instances of inactivity; generating, based at least in part on the at least one particular duration of inactivity, one or more sleep mode configuration modification recommendations for the device(s); and performing one or more automated actions based on the one or more sleep mode configuration modification recommendations.

20 Claims, 7 Drawing Sheets

AUTOMATED POWER-RELATED DEVICE USAGE DETERMINATIONS USING ARTIFICIAL INTELLIGENCE TECHNIQUES

FIELD

The field relates generally to information processing systems, and more particularly to techniques for managing devices in such systems.

BACKGROUND

Power usage by computers and other processing devices accounts for non-trivial amounts of global electricity consumption and greenhouse gas emissions. Conventional device management approaches include utilizing sleep modes, wherein sleep modes transition devices to operation states which use less power. However, such conventional approaches typically implement static sleep mode settings based on a limited number of arbitrary temporal parameters, which often leads to the wasting of electricity resources.

SUMMARY

Illustrative embodiments of the disclosure provide techniques for automated power-related device usage determinations using artificial intelligence techniques.

An exemplary computer-implemented method includes determining power-related information for one or more devices by processing utilization data associated with the one or more devices using one or more artificial intelligence techniques. Also, the method includes determining, based at least in part on the power-related information, multiple instances of inactivity and durations thereof for the one or more devices, and determining at least one particular duration of inactivity for the one or more devices based at least in part on a number of occurrences of each of the determined durations of instances of inactivity. Further, the method additionally includes generating, based at least in part on the at least one particular duration of inactivity, one or more sleep mode configuration modification recommendations for the one or more devices, and performing one or more automated actions based at least in part on the one or more sleep mode configuration modification recommendations.

Illustrative embodiments can provide significant advantages relative to conventional device management approaches. For example, problems associated with static sleep mode settings based on a limited number of arbitrary temporal parameters are overcome in one or more embodiments through automatically determining device sleep mode configuration modifications using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
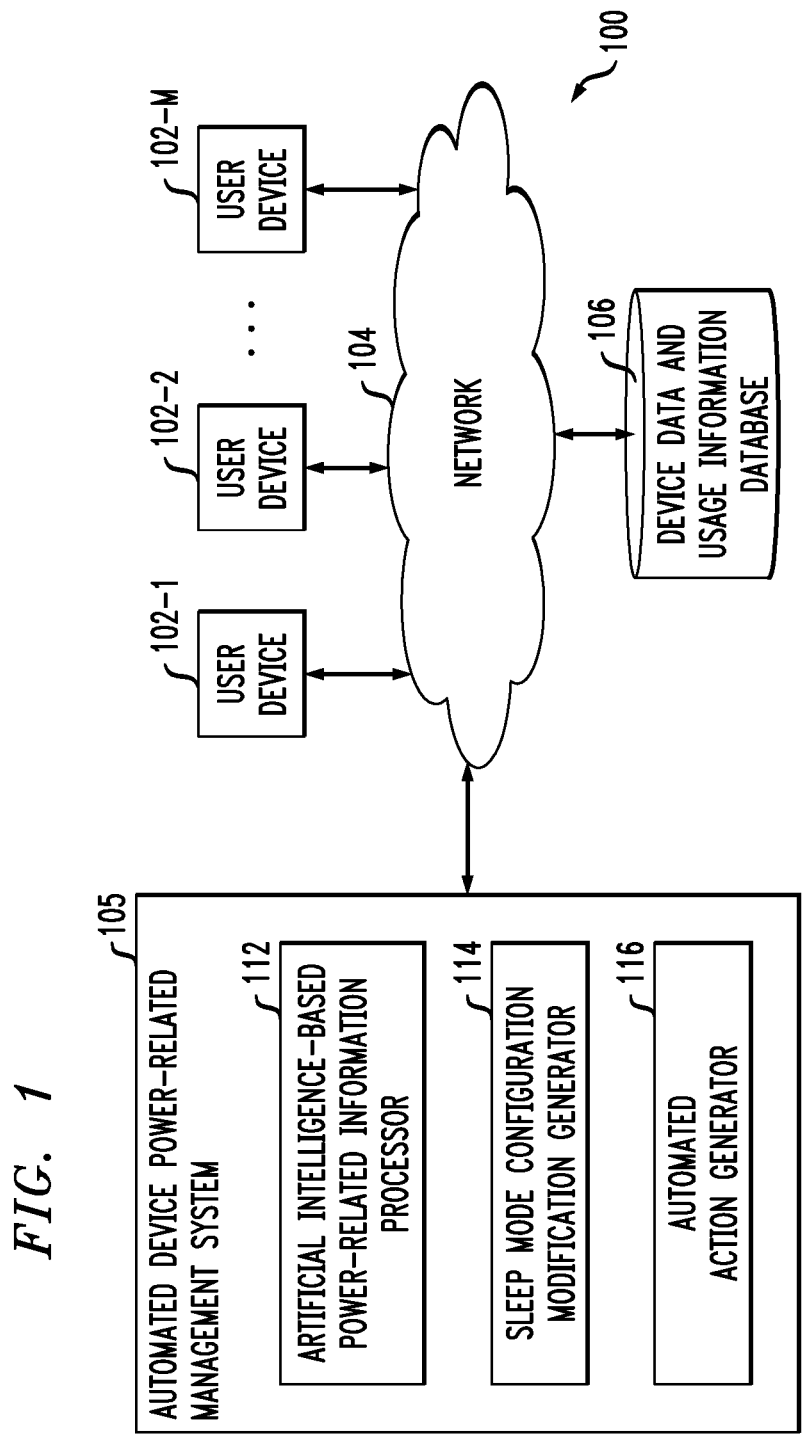
FIG. 1 shows an information processing system configured for automated power-related device usage determinations using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated device power-related management system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated device power-related management system 105 can have an associated device data and usage information database 106 configured to store data pertaining to device model and configuration data, device power-related data, and device usage information (e.g., temporal information, pattern-based information, etc.).

The device data and usage information database 106 in the present embodiment is implemented using one or more storage systems associated with automated device power-related management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated device power-related management system 105 are one or more input-output devices, which illustratively comprise keyboards, displays or other types of input-output devices in any combination. Such input-output devices can be used, for example, to support one or more user interfaces to automated device power-related management system 105, as well as to support communication between automated device power-related management system 105 and other related systems and devices not explicitly shown.

Additionally, automated device power-related management system 105 in the FIG. 1 embodiment is assumed to be implemented using at least one processing device. Each such processing device generally comprises at least one processor and an associated memory, and implements one or more functional modules for controlling certain features of automated device power-related management system 105.

More particularly, automated device power-related management system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated device power-related management system 105 to communicate over the network 104 with the user devices 102, and illustratively comprises one or more conventional transceivers.

The automated device power-related management system 105 further comprises artificial intelligence-based power-related information processor 112, sleep mode configuration modification generator 114, and automated action generator 116.

It is to be appreciated that this particular arrangement of elements 112, 114 and 116 illustrated in the automated device power-related management system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated power-related device usage determinations using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated device power-related management system 105 and device data and usage information database 106 can be on and/or part of the same processing platform.

An exemplary process utilizing elements 112, 114 and 116 of an example automated device power-related management system 105 in computer network 100 will be described in more detail with reference to the flow diagram of FIG. 6.

Accordingly, at least one embodiment includes performing automated power-related device usage determinations using artificial intelligence techniques. Such an embodiment includes implementing at least one framework to learn and/or understand user usage of any system or processing device, and to recommend and/or automatically initiate one or more modifications to the system's or processing device's sleep mode configurations and/or settings to reduce electricity consumption and corresponding carbon dioxide footprint.

As further detailed herein, one or more embodiments include determining power consumption information (also referred to herein as electricity consumption information) associated with one or more devices using one or more artificial intelligence techniques (e.g., multiple linear regression techniques) and prioritizing operation settings of the device(s) based at least in part thereon. As noted above, power consumption can be directly correlated with carbon dioxide emissions that negatively affect the environment. Accordingly, such an embodiment includes reducing the power consumption and carbon dioxide impacts of devices by enhancing the transition of devices to sleep modes when not actively in use by users based at least in part on one or more determined user device usage patterns.

In connection with one or more embodiments, prioritized devices (e.g., devices with dynamically determined sleep mode initiation settings, such as detailed herein) are shown and/or identified to the user and/or at least one administrator associated with the devices (e.g., in the context of enterprise and/or commercial devices wherein, for example, an information technology administrator can take bulk actions on groups of devices) for the implementation of one or more device sustainability-related actions (e.g., modifying sleep mode settings in accordance with the dynamically determined sleep mode initiation settings). Additionally or alternatively, such an embodiment can also include automatically setting one or more devices into system-driven sleep mode if the electricity consumption and/or carbon dioxide impact is beyond at least one given threshold value (e.g., such as set by the user(s) and/or administrator associated with the device(s)).

One factor utilized by at least one embodiment in determining power consumption and/or carbon dioxide impact by a given device is determination of the duration(s) wherein the device is powered on when not actively in use by at least one user. Such an embodiment includes periodically and/or continuously monitoring the inactive time of a device and determining the minimum inactive time with the maximum number of occurrences over a given temporal period. As used herein, "inactive" refers to user activity, in connection with a given device and/or system, below a predetermined threshold, wherein such user activity can include activity related to, for example, device and/or system bandwidth, device and/or system input-output (IO) size, device and/or system input-output operations per second (IOPS), device and/or system CPU utilization, device and/or system queue length, etc.

As further detailed herein, in one or more embodiments, once the minimum inactive time of a device is determined and/or identified, and if the minimum inactive time of the device is less than the default sleep mode setting for the device, the device can be automatically configured to transition to a sleep mode when the inactive time of the device exceeds the determined minimum inactive time (which will occur sooner than were the device to transition to a sleep mode upon exceeding the amount of time designated by the default sleep mode setting). Accordingly, such an embodiment includes enabling the device to transition to a sleep mode earlier than the default settings, thereby reducing power consumption and/or carbon dioxide impacts.

As further detailed herein and below, one or more embodiments include determining power consumption information (e.g., one or more power consumption patterns) of one or more devices using multiple linear regression, determining inactive times and durations thereof for the one or more devices, determining the minimum inactive time for each of the one or more devices based at least in part on the inactive time durations and the number of occurrences of inactive times, determining and/or recommending one or more automated and/or system-driven sleep mode settings for each of the one or more devices, and automatically transitioning each of the one or more devices to sleep mode in accordance with the system-driven sleep mode settings (e.g., once the device exceeds the minimum inactive time).

Figure 2:
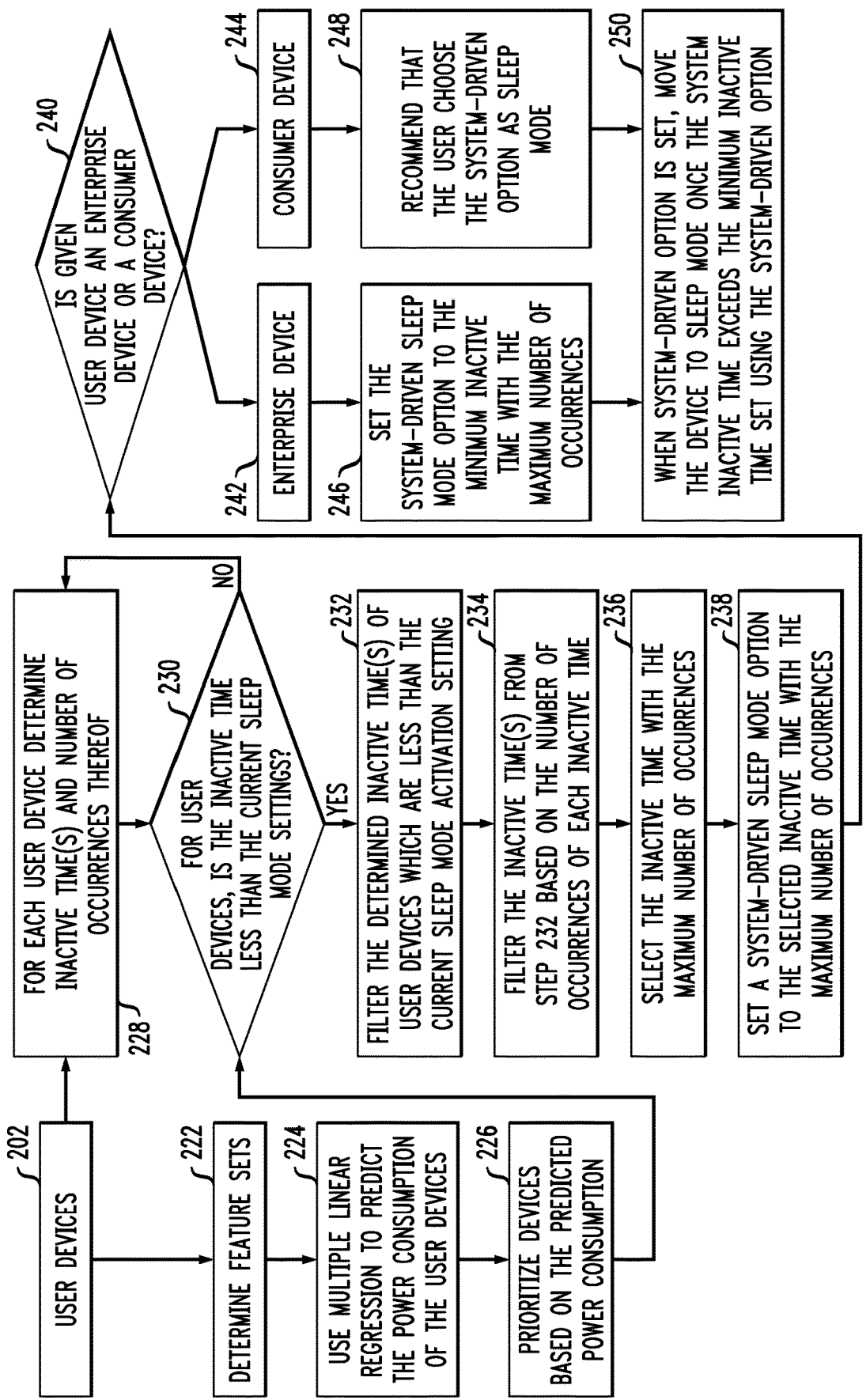
FIG. 2 shows an example workflow in accordance with an illustrative embodiment.

FIG. 2 shows an example workflow in accordance with an illustrative embodiment. By way of illustration, FIG. 2 depicts an example workflow for determining power consumption information of user devices 202 using one or more artificial intelligence techniques (such as, for example, multiple linear regression techniques). In accordance with such an embodiment, the one or more artificial intelligence techniques include determining, for each user device 202, a feature set in step 222, wherein the feature set includes various independent variables (e.g., device attributes) in determining the dependent value (i.e., power consumption information of the device). Such independent variables can include for example, inactive times associated with user devices 202, minimum inactive time with the maximum number of occurrences over a given temporal period (e.g., wherein the given temporal period is user-configurable), system utilization information associated with user devices 202 (e.g., CPU utilization, memory utilization, hard disk drive (HDD) utilization, etc.), ambient temperature information pertaining to one or more environments proximate to the device, connected components of user devices 202 with fault percentage(s) (e.g., speakers with a fault percentage of 20%, etc.), device configuration information with fault percentage(s) (e.g., fan rotation speed with a fault percentage of 5%, etc.), age of the user device 202, etc.

As further depicted in FIG. 2, step 224 includes using multiple linear regression techniques to predict the dependent variable (e.g., power consumption and/or carbon dioxide impact by user devices 202) based at least in part on the feature set determined in step 222. In one or more embodiments, the following equation can be used in connection with a given multiple linear regression technique used in step 224:

$$y = \beta_0 + \beta_1 x_1 + \beta_2 x_2 + \dots \beta_p x_p + \varepsilon$$

wherein y represents the predicted power consumption and/or carbon dioxide impact score, $\beta$ represents the intercept (e.g., wherein the intercept in a multiple regression model represents the mean for the response when all of the explanatory variables take on the value of zero), x represents independent variables (such as, for example, detailed above), and $\xi$ represents the error.

Based at least in part on a power consumption and/or carbon dioxide impact determination such as detailed above, step 226 includes prioritizing the user devices 202 (e.g., in relation to each other) from a power consumption and/or carbon dioxide impact perspective.

Also, step 228 includes determining inactive times and durations thereof for user devices 202. Such an embodiment includes monitoring user devices 202 and retrieving, from user devices 202, information pertaining to elements such as, for example, system bandwidth, system IO size, system IOPS, system CPU utilization, system queue length, etc. Such information can then be processed using one or more artificial intelligence-based time series forecasting techniques (e.g., at least one Prophet forecasting technique) to determine and/or predict times of inactivity for user devices 202 and durations of such times of inactivity. In an example embodiment utilizing a Prophet forecasting technique, such an embodiment includes forecasting inactive times of user devices 202 based at least in part on an addictive model, wherein one or more non-linear trends can be fit with one or more temporally based effects (e.g., yearly effects, weekly effects, daily effects, seasonality effects, holiday effects, etc.).

Accordingly, by collating data such as noted above in connection with the device monitoring, one or more embodiments can include estimating device inactive times and durations thereof. In at least one example embodiment, such monitoring can be a continuous activity carried out using software such as, e.g., one or more device management applications.

After determining times of device inactivity and durations thereof, at least one embodiment includes sorting the times of device inactivity based at least in part on the duration of each such time. Based on such sorting, such an embodiment then includes identifying the inactive time with the minimum duration and the maximum number of occurrences.

Referring again to FIG. 2, step 230 includes determining, for user devices 202, whether the determined inactive times are less than current sleep mode activation settings. If no (i.e., one or more determined inactive times are more/longer than the current sleep mode activation settings), then the workflow returns to step 228. If yes (i.e., one or more determined inactive times are less/shorter than the current sleep mode activation settings), step 232 includes filtering the determined inactive times of such user devices 202 which are less than the current sleep mode activation setting. Step 234 includes filtering the inactive times from step 232 based on the number of occurrences of each inactive time. Further, step 236 includes selecting the inactive time with the maximum number of occurrences.

As also depicted in FIG. 2, step 238 includes setting, for one or more of the user devices 202, a system-driven sleep mode option to the selected inactive time with the maximum number of occurrences. Additionally, step 240 includes determining whether a given user device is an enterprise device or a consumer device. If an enterprise device 242, step 246 includes setting (e.g., automatically setting remotely and/or via at least one administrator device) the system-driven sleep mode option to the inactive time with the maximum number of occurrences for that user device. If the given user device is a consumer device 244, step 248 includes recommending (e.g., automatically generating and outputting a recommendation to the user device) that the user choose the system-driven option as a sleep mode.

As also depicted in FIG. 2, step 250 includes, when system-drive sleep mode is set, transitioning the given user device to sleep mode once the device's inactive time exceeds the minimum inactive time set using the system-driven option.

Figure 3:
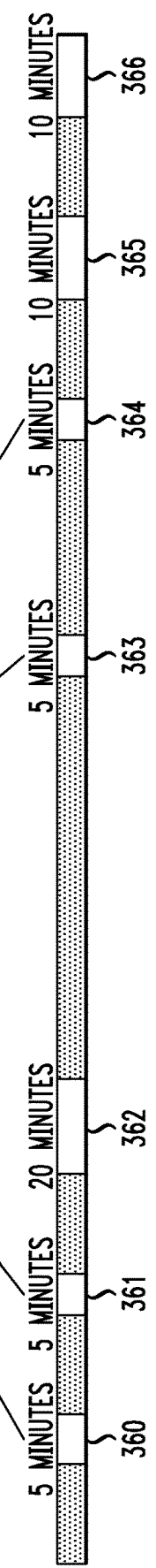
FIG. 3 shows example minimum inactive time determinations in an illustrative embodiment.

FIG. 3 shows example minimum inactive time determinations in an illustrative embodiment. By way merely of illustration, FIG. 3 depicts an example use case wherein, per a device inactive time forecast carried out such as detailed above, a given device will be inactive seven times in a day, designated in FIG. 3 as times 360, 361, 362, 363, 364, 365 and 366. Out of those seven times, four times encompass instances of device inactivity lasting five minutes (i.e., inactive times 360, 361, 363 and 364), one time encompasses an instance of device inactivity lasting twenty minutes (i.e., inactive time 362), and two times encompass instances of device inactivity lasting ten minutes (i.e., inactive times 365 and 366). In one or more embodiments, the forecasted inactive time durations can include one or more time thresholds (e.g., at least five minutes, at least ten minutes, etc.) and/or precise amounts of time. Accordingly, as the device is forecasted to be inactive for five minutes for the largest number of instances (that is, four instances (specifically, inactive times 360, 361, 363 and 364), which is more than the two instances of ten minutes and the one instance of twenty minutes), five minutes is selected as the minimum inactive time after which the device is to be transitioned to sleep mode.

Figure 4:
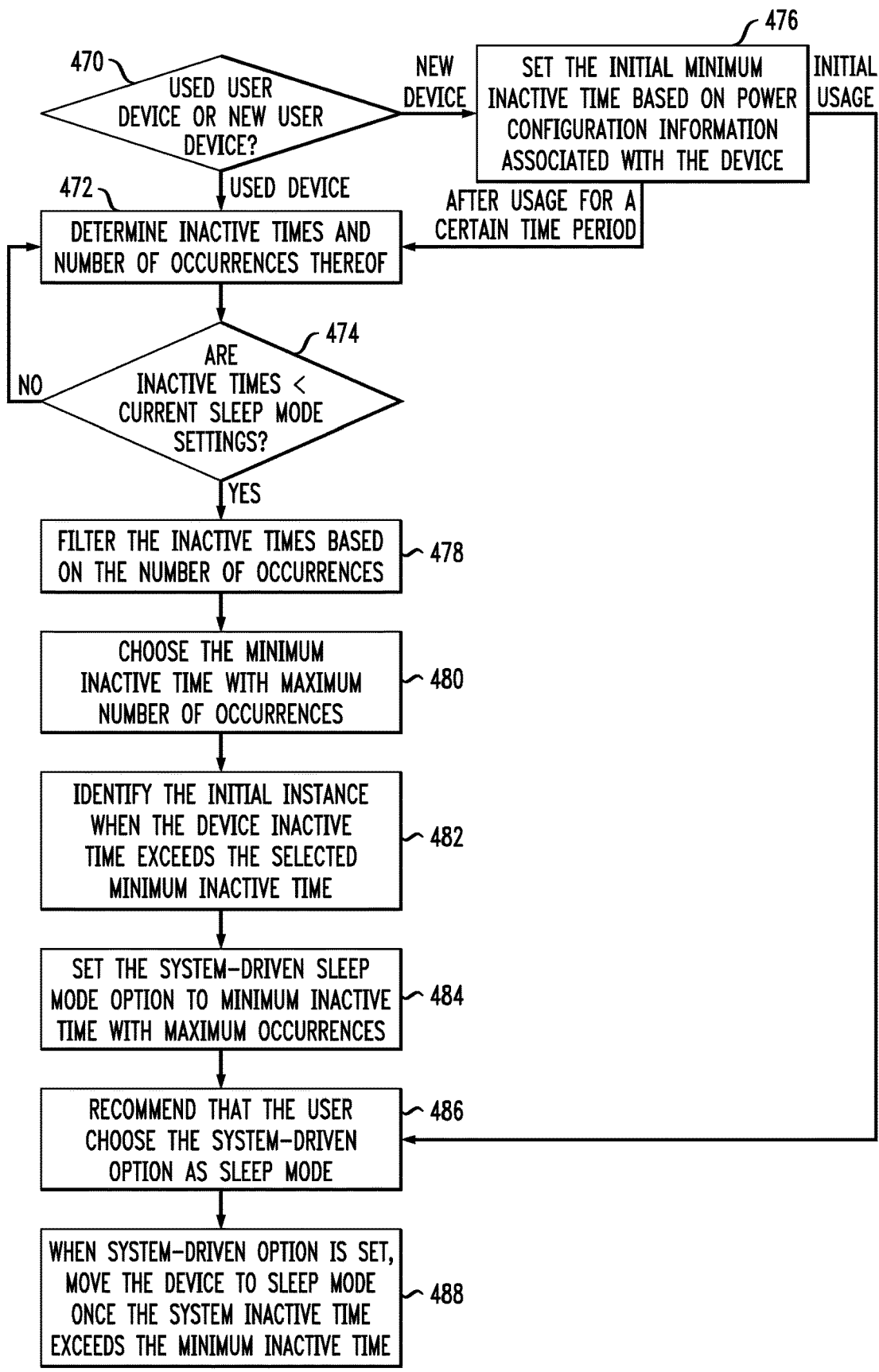
FIG. 4 shows an example workflow in accordance with an illustrative embodiment.

FIG. 4 shows an example workflow in accordance with an illustrative embodiment. By way of illustration, step 470 includes determining whether a given device is a new device or a used device. For a new device (that is, a device with no prior usage and therefore no usage data to process), step 476 includes setting the initial minimum inactive time (after which the device is to be transitioned to sleep mode) based at least in part on power configuration information associated with the device and specifications of the device model. By way of example, in accordance with such an embodiment, the higher the values associated with one or more device configuration parameters, the lower the initial value of inactive time (e.g., because higher device configuration values (e.g., memory configuration values, CPU capacity values, HDD capacity values, etc.) can often equate to greater power consumption). Additionally, after the device has been in use for a predetermined period of time, step 472 (which is also the first step after determining the given device is a used device in step 470) includes determining inactive times and the number of occurrences thereof. Additionally, with respect to step 476 and in connection with the initial use of the new device, step 486 can be carried out, which includes recommending to the user (of the new device) that system-driven sleep mode be selected and/or activated.

Subsequent to step 472, step 474 includes determining whether the determined inactive times are less/shorter than current sleep mode settings. If no (i.e., the determined inactive times are more/longer than current sleep mode settings), the workflow returns to step 472. If yes (i.e., the determined inactive times are less/shorter than current sleep mode settings), step 478 includes filtering the inactive times based on the number of occurrences of each inactive time. Further, step 480 includes selecting the inactive time with the maximum number of occurrences.

As also depicted in FIG. 4, step 482 includes identifying the initial instance when the device inactive time exceeds the selected minimum inactive time. Step 484 includes setting the system-driven sleep mode option to the selected inactive time with the maximum number of occurrences. Step 486, as noted above, then includes recommending to the user of the device that system-driven sleep mode be selected and/or activated. Further, step 488 includes, when system-drive sleep mode is set, transitioning the given device to sleep mode once the device's inactive time exceeds the minimum inactive time set using the system-driven option.

As also noted herein, one or more embodiments include recommend one or more system-driven sleep mode parameters. By way of example, in connection with a consumer device, if the predicted power consumption of the device is more than a given amount, and the minimum inactive time of the device is less than the default sleep mode settings, at least one embodiment can include generating and displaying a recommendation (e.g., via the graphical user interface of the device) to the user indicating that a system-driven sleep mode configuration can automate initiation of the device to transition into sleep mode based on the device inactive time. Such a recommendation can be accompanied, for example, by a prompt for the user to accept such a recommendation and modify the device's sleep mode settings accordingly. Alternatively, such a recommendation can indicate that the device's sleep mode settings have been modified accordingly automatically, and that manual action by the user is required to reverse such action.

Accordingly, at least one embodiment can include providing an option, using the graphical user interface of the given device (e.g., an interface associated with a Power and Sleep window), to change the sleep mode designation from a default option to a system-driven option.

By way of further illustration, in connection with enterprise devices (e.g., one or more groups of devices associated with and/or administrated by a given enterprise), once the devices are prioritized based at least in part on power consumption (such as detailed herein, for example), the devices are listed (e.g., in a device management application) in conjunction with one or more details such as, for example, power consumption (e.g., listed from highest to lowest), carbon dioxide impact (e.g., listed from highest to lowest), and recommendations to switch to system-driven mode (e.g., from strongest recommendation to weakest recommendation) for devices having inactive times less than the default sleep mode temporal designations.

Additionally, in such an embodiment, at least one administrator (e.g., an information administrator associated with the given group(s) of enterprise devices) can select one or more devices and push one or more configuration updates to those device(s) to change sleep mode settings to system-driven.

As also noted herein, one or more embodiments include automatically initiating one or more actions to transition a device to sleep mode once the device exceeds a corresponding minimum inactive time. In such an embodiment, when the sleep mode settings for a given device are set to system-driven, the device is transitioned to sleep mode once the device's inactive time exceeds the designated minimum inactive time. By way of illustration, consider an example use case wherein, per an artificial intelligence-based forecast, the device will be inactive seven times a day. Note that if the sleep mode is set to automated and/or system-driven, irrespective of inactive time duration, the device will be automatically transitioned to sleep mode after five minutes (that is, the minimum inactive time identified and/or determined, as detailed above). Such automated action via system-driven sleep mode settings increases the amount of time that the device spends in sleep mode, thereby reducing power consumption reducing the carbon emissions associated with the device.

Figure 5:
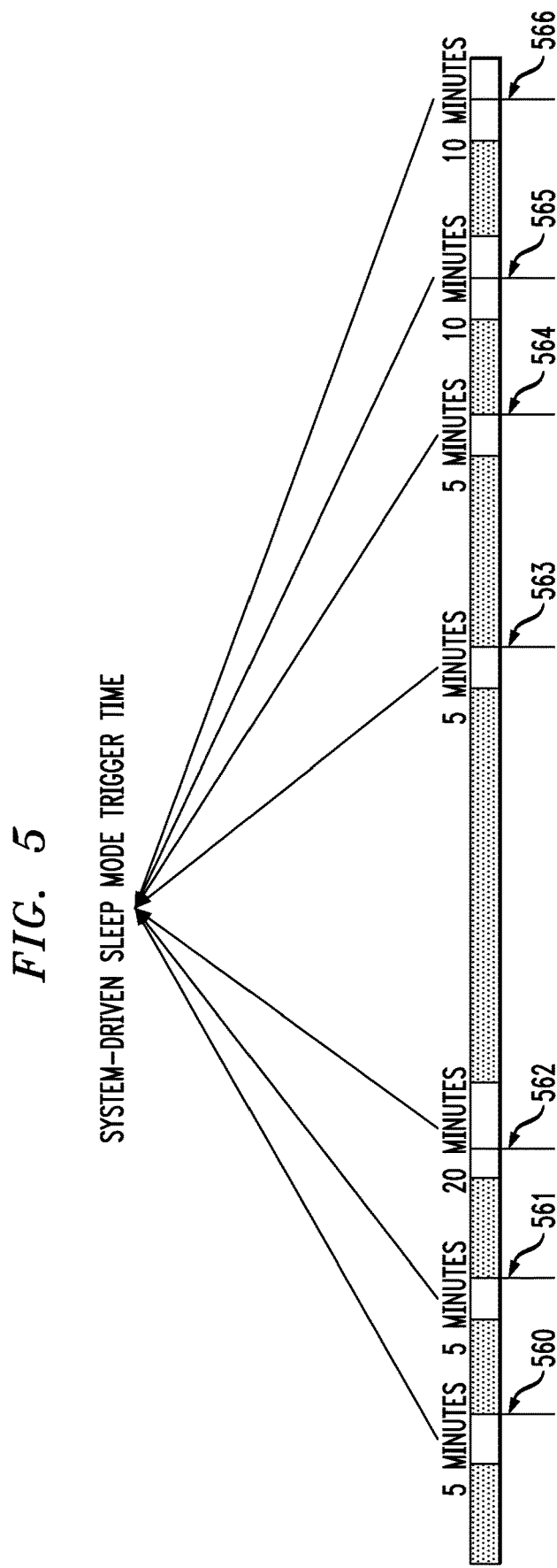
FIG. 5 shows example sleep mode trigger times in an illustrative embodiment.

FIG. 5 shows example sleep mode trigger times in an illustrative embodiment. By way merely of illustration, FIG. 5 depicts, similar to that of FIG. 3, an example use case wherein, per a device inactive time forecast carried out such as detailed above, a given device will be inactive seven times in a day. As noted in connection with FIG. 3, because the device is forecasted to be inactive for five minutes for the largest number of instances, five minutes is selected as the minimum inactive time after which the device is to be transitioned to sleep mode. Accordingly, FIG. 5 depicts the system-driven sleep mode trigger times for each of the depicted inactive times. Specifically, the device is transitioned to sleep mode at the end of the first inactive time (denoted by vertical line 560), at the end of the second inactive time (denoted by vertical line 561), five minutes into the third inactive time (denoted by vertical line 562), at the end of the fourth inactive time (denoted by vertical line 563), at the end of the fifth inactive time (denoted by vertical line 564), five minutes into the sixth inactive time (denoted by vertical line 565), and five minutes into the seventh inactive time (denoted by vertical line 566).

Additionally, in one or more embodiments, if battery drain time is less than the minimum inactive time determined to trigger sleep mode, the system-driven sleep mode will transition the device to sleep mode before the battery drains completely (e.g., two minutes before the battery drains completely).

Figure 6:
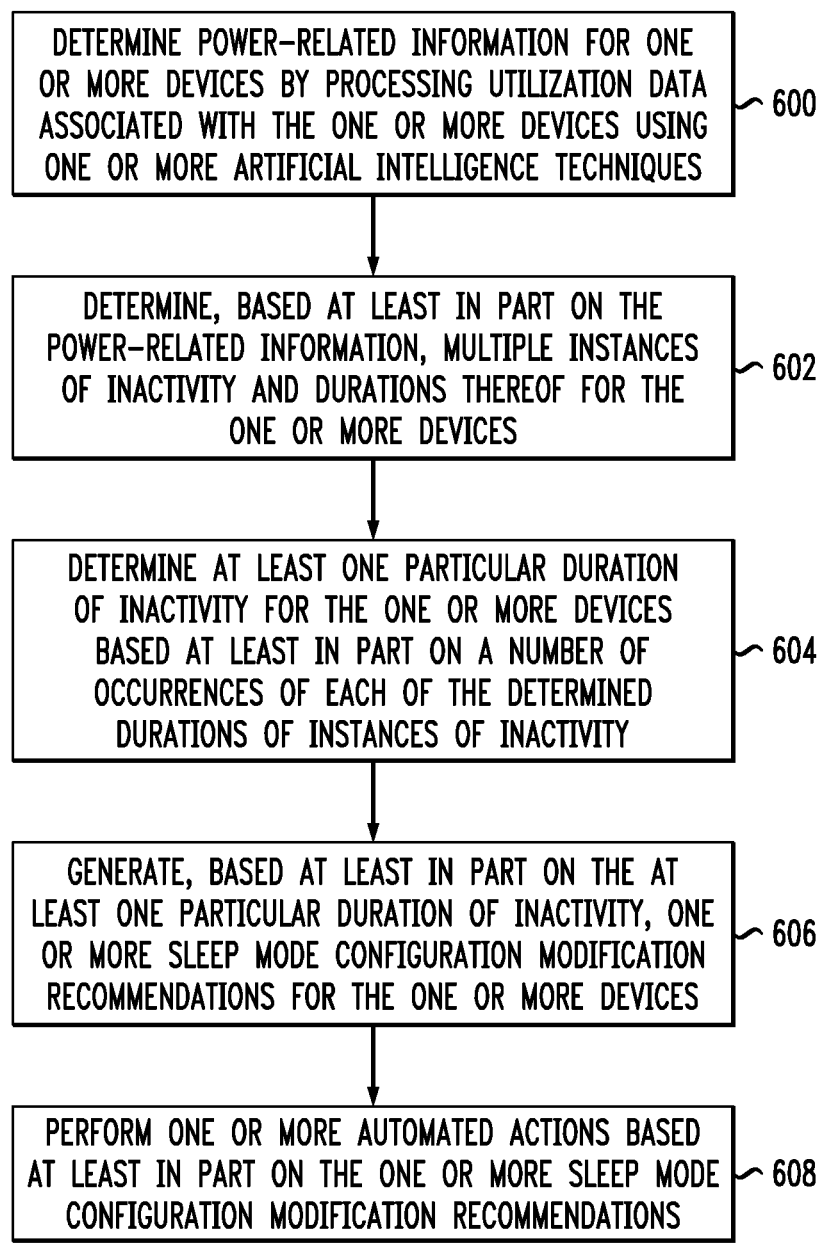
FIG. 6 is a flow diagram of a process for automated power-related device usage determinations using artificial intelligence techniques in an illustrative embodiment.

FIG. 6 is a flow diagram of a process for automated power-related device usage determinations using artificial intelligence techniques in an illustrative embodiment. It is to be understood that this particular process is only an example, and additional or alternative processes can be carried out in other embodiments.

In this embodiment, the process includes steps 600 through 608. These steps are assumed to be performed by the automated device power-related management system 105 utilizing elements 112, 114 and 116.

Step 600 includes determining power-related information for one or more devices by processing utilization data associated with the one or more devices using one or more artificial intelligence techniques. In at least one embodiment, processing utilization data associated with the one or more devices using one or more artificial intelligence techniques includes processing the utilization data associated with the one or more devices using one or more multiple linear regression techniques. Additionally or alternatively, processing utilization data associated with the one or more devices using one or more artificial intelligence techniques can include processing the utilization data associated with the one or more devices using one or more artificial intelligence-based time series forecasting techniques.

In one or more embodiments, determining power-related information for the one or more devices includes calculating information pertaining to carbon dioxide emissions associated with the one or more devices by processing utilization data associated with the one or more devices using one or more artificial intelligence techniques. Also, in at least one embodiment, processing utilization data associated with the one or more devices using one or more artificial intelligence techniques includes processing, using the one or more artificial intelligence techniques, one or more of central processing unit utilization data, memory utilization data, hard disk drive utilization data, data pertaining to one or more connected components of the one or more devices and fault information related thereto, one or more items of configuration information with fault information related thereto, and data pertaining to age of the one or more devices. Additionally or alternatively, processing utilization data associated with the one or more devices using one or more artificial intelligence techniques can include processing, using the one or more artificial intelligence techniques, information pertaining to one or more of device bandwidth, device input-output size, device input-output operations per second, and device queue length.

Step 602 includes determining, based at least in part on the power-related information, multiple instances of inactivity and durations thereof for the one or more devices. Step 604 includes determining at least one particular duration of inactivity for the one or more devices based at least in part on a number of occurrences of each of the determined durations of instances of inactivity. In at least one embodiment, the at least one particular duration of inactivity includes, by way merely of example, at least one minimum duration of inactivity. In such an embodiment, determining the at least one minimum duration of inactivity includes identifying one of the multiple durations of inactivity associated with the most instances of inactivity across the multiple determined instances of inactivity. Step 606 includes generating, based at least in part on the at least one particular duration of inactivity, one or more sleep mode configuration modification recommendations for the one or more devices.

Step 608 includes performing one or more automated actions based at least in part on the one or more sleep mode configuration modification recommendations. In at least one embodiment, performing one or more automated actions includes automatically modifying one or more sleep mode configurations for at least one of the one or more devices in accordance with the one or more sleep mode configuration modification recommendations. Additionally or alternatively, performing one or more automated actions can include automatically transitioning at least one of the one or more devices to sleep mode upon determining that inactivity attributed to the at least one device exceeded the at least one minimum duration of inactivity.

In one or more embodiments, performing one or more automated actions includes automatically training at least a portion of the one or more artificial intelligence techniques using feedback related to the one or more sleep mode configuration modification recommendations. Additionally or alternatively, performing one or more automated actions can include prioritizing the one or more devices from a power consumption perspective using the one or more sleep mode configuration modification recommendations.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically perform and implement power-related device usage determinations using artificial intelligence techniques. These and other embodiments can effectively overcome problems associated with static sleep mode settings based on a limited number of arbitrary temporal parameters.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
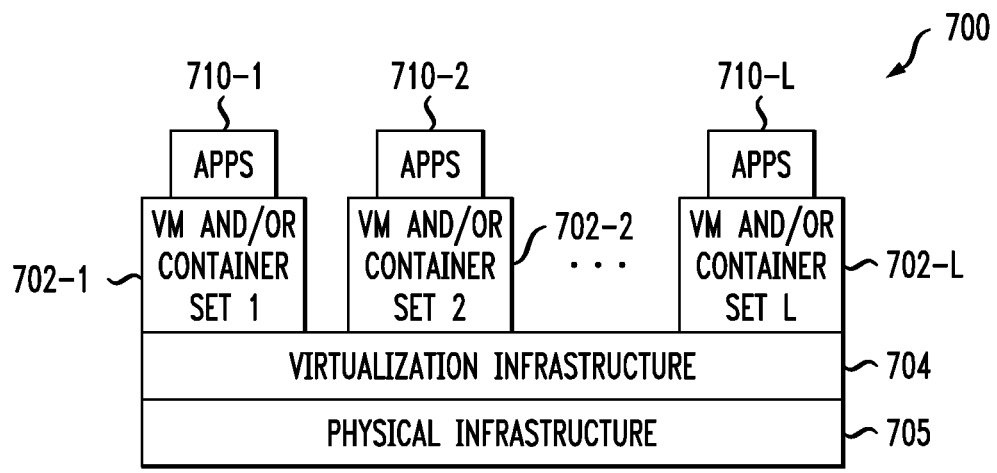
FIGS. 7 and 8 show examples of processing platforms that may be utilized to implement at least a portion of an information processing system in illustrative embodiments.
Figure 8:
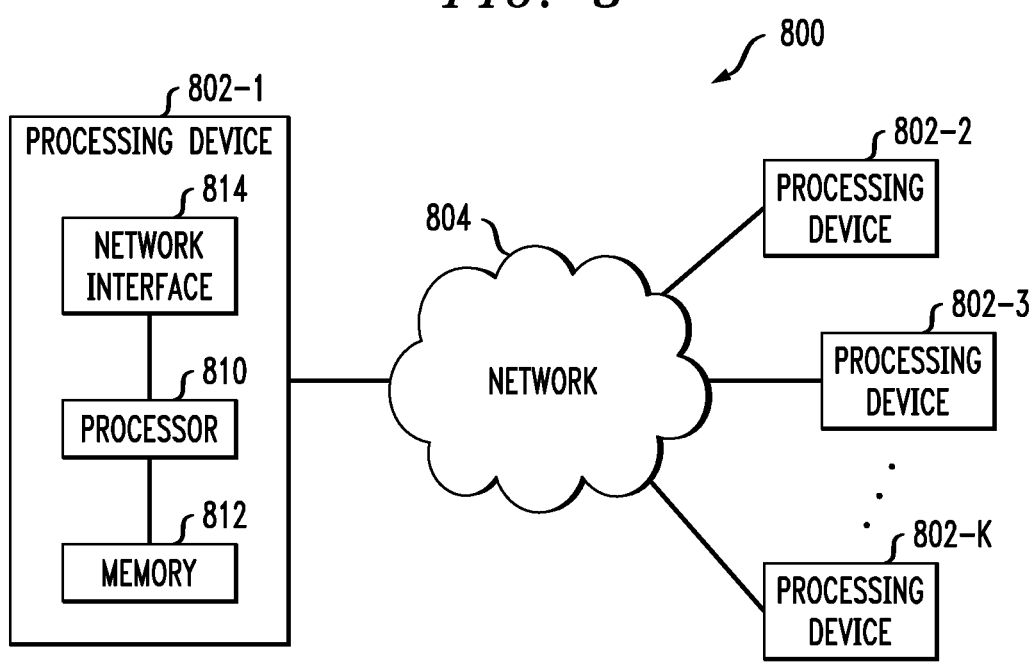

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more information processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   determining power-related information for one or more devices by processing utilization data associated with the one or more devices using one or more artificial intelligence techniques;
   determining, based at least in part on the power-related information, multiple instances of inactivity and durations thereof for the one or more devices;
   determining at least one particular duration of inactivity for the one or more devices based at least in part on a number of occurrences of each of the determined durations of instances of inactivity;
   generating, based at least in part on the at least one particular duration of inactivity, one or more sleep mode configuration modification recommendations for the one or more devices; and
   performing one or more automated actions based at least in part on the one or more sleep mode configuration modification recommendations;
   wherein the method is performed by at least one processing device comprising a processor coupled to a memory.

2. The computer-implemented method of claim 1, wherein the at least one particular duration of inactivity comprises at least one minimum duration of inactivity.

3. The computer-implemented method of claim 2, wherein determining the at least one minimum duration of inactivity comprises identifying one of the multiple durations of inactivity associated with the most instances of inactivity across the multiple determined instances of inactivity.

4. The computer-implemented method of claim 1, wherein performing one or more automated actions comprises automatically modifying one or more sleep mode configurations for at least one of the one or more devices in accordance with the one or more sleep mode configuration modification recommendations.

5. The computer-implemented method of claim 1, wherein performing one or more automated actions comprises automatically transitioning at least one of the one or more devices to sleep mode upon determining that inactivity attributed to the at least one device exceeded the at least one particular duration of inactivity.

6. The computer-implemented method of claim 1, wherein processing utilization data associated with the one or more devices using one or more artificial intelligence techniques comprises processing the utilization data associated with the one or more devices using one or more multiple linear regression techniques.

7. The computer-implemented method of claim 1, wherein processing utilization data associated with the one or more devices using one or more artificial intelligence techniques comprises processing the utilization data associated with the one or more devices using one or more artificial intelligence-based time series forecasting techniques.

8. The computer-implemented method of claim 1, wherein determining power-related information for the one or more devices comprises calculating information pertaining to carbon dioxide emissions associated with the one or more devices by processing utilization data associated with the one or more devices using one or more artificial intelligence techniques.

9. The computer-implemented method of claim 1, wherein processing utilization data associated with the one or more devices using one or more artificial intelligence techniques comprises processing, using the one or more artificial intelligence techniques, one or more of central processing unit utilization data, memory utilization data, hard disk drive utilization data, data pertaining to one or more connected components of the one or more devices and fault information related thereto, one or more items of configuration information with fault information related thereto, and data pertaining to age of the one or more devices.

10. The computer-implemented method of claim 1, wherein processing utilization data associated with the one or more devices using one or more artificial intelligence techniques comprises processing, using the one or more artificial intelligence techniques, information pertaining to one or more of device bandwidth, device input-output size, device input-output operations per second, and device queue length.

11. The computer-implemented method of claim 1, wherein performing one or more automated actions comprises automatically training at least a portion of the one or more artificial intelligence techniques using feedback related to the one or more sleep mode configuration modification recommendations.

12. The computer-implemented method of claim 1, wherein performing one or more automated actions comprises prioritizing the one or more devices from a power consumption perspective using the one or more sleep mode configuration modification recommendations.

13. A non-transitory processor-readable storage medium having stored therein program code of one or more software programs, wherein the program code when executed by at least one processing device causes the at least one processing device:
  to determine power-related information for one or more devices by processing utilization data associated with the one or more devices using one or more artificial intelligence techniques;
  to determine, based at least in part on the power-related information, multiple instances of inactivity and durations thereof for the one or more devices;
  to determine at least one particular duration of inactivity for the one or more devices based at least in part on a number of occurrences of each of the determined durations of instances of inactivity;
  to generate, based at least in part on the at least one particular duration of inactivity, one or more sleep mode configuration modification recommendations for the one or more devices; and
  to perform one or more automated actions based at least in part on the one or more sleep mode configuration modification recommendations.

14. The non-transitory processor-readable storage medium of claim 13, wherein the at least one particular duration of inactivity comprises at least one minimum duration of inactivity.

15. The non-transitory processor-readable storage medium of claim 14, wherein determining the at least one minimum duration of inactivity comprises identifying one of the multiple durations of inactivity associated with the most instances of inactivity across the multiple determined instances of inactivity.

16. The non-transitory processor-readable storage medium of claim 13, wherein performing one or more automated actions comprises automatically modifying one or more sleep mode configurations for at least one of the one or more devices in accordance with the one or more sleep mode configuration modification recommendations.

17. An apparatus comprising:
  at least one processing device comprising a processor coupled to a memory;
  the at least one processing device being configured:
    to determine power-related information for one or more devices by processing utilization data associated with the one or more devices using one or more artificial intelligence techniques;
    to determine, based at least in part on the power-related information, multiple instances of inactivity and durations thereof for the one or more devices;
    to determine at least one particular duration of inactivity for the one or more devices based at least in part on a number of occurrences of each of the determined durations of instances of inactivity;
    to generate, based at least in part on the at least one particular duration of inactivity, one or more sleep mode configuration modification recommendations for the one or more devices; and
    to perform one or more automated actions based at least in part on the one or more sleep mode configuration modification recommendations.

18. The apparatus of claim 17, wherein the at least one particular duration of inactivity comprises at least one minimum duration of inactivity.

19. The apparatus of claim 18, wherein determining the at least one minimum duration of inactivity comprises identifying one of the multiple durations of inactivity associated with the most instances of inactivity across the multiple determined instances of inactivity.

20. The apparatus of claim 17, wherein performing one or more automated actions comprises automatically modifying one or more sleep mode configurations for at least one of the one or more devices in accordance with the one or more sleep mode configuration modification recommendations.

* * * * *